May 9, 1950     A. R. STONE     2,507,484
VEHICLE CONTROL
Filed July 10, 1946     4 Sheets-Sheet 1
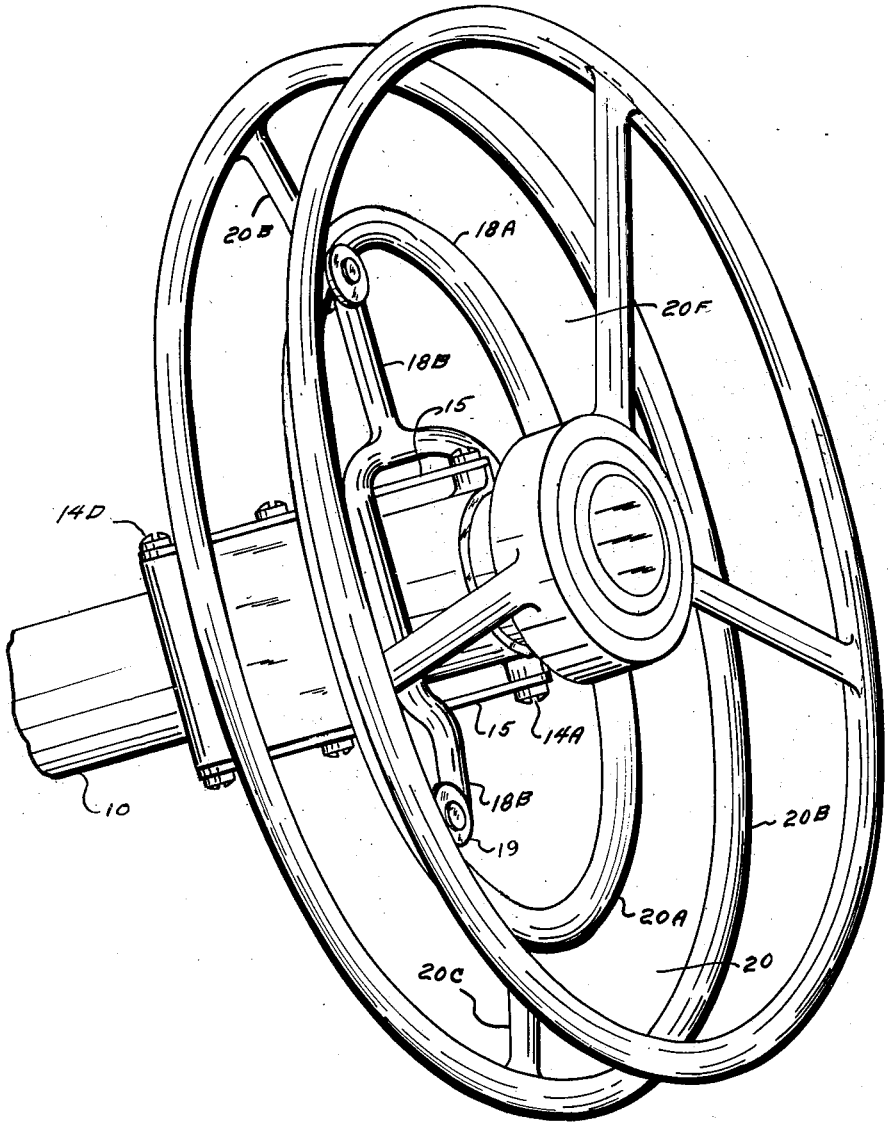
Fig. 1.
INVENTOR.
ALBERT R. STONE
BY
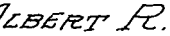
HIS ATTORNEY May 9, 1950     A. R. STONE     2,507,484
VEHICLE CONTROL Filed July 10, 1946     4 Sheets-Sheet 2

INVENTOR.
ALBERT R. STONE
BY
HIS ATTORNEY

May 9, 1950 A. R. STONE 2,507,484
VEHICLE CONTROL
Filed July 10, 1946 4 Sheets-Sheet 3

INVENTOR.
ALBERT R. STONE
BY
HIS ATTORNEY

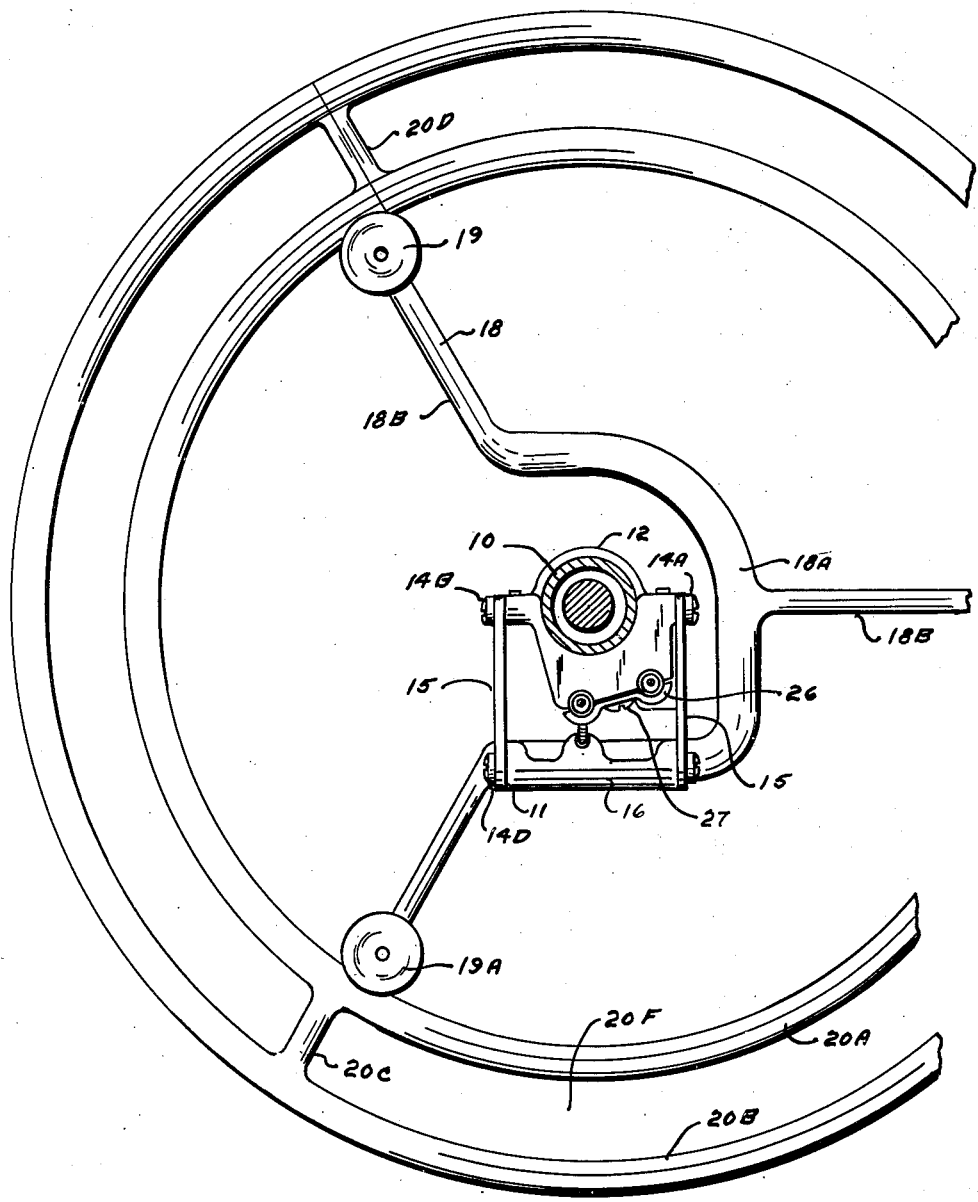

Patented May 9, 1950

2,507,484

UNITED STATES PATENT OFFICE 2,507,484

VEHICLE CONTROL

Albert Rivington Stone, Baltimore, Md.

Application July 10, 1946, Serial No. 682,567

9 Claims. (Cl. 74—486)

My invention relates to automobile steering controls. More particularly, it concerns automobile steering control assemblies facilitating vehicle operation by handicapped persons. By the term "handicapped persons" I designate those who are unable to operate the ordinary foot controls of the conventional automotive vehicle, because of physical affliction or other reason. My invention has application either to entirely new automotive equipment, or to vehicles already in operation, the control assembly of which is to be modified by the installation of my new equipment.

An object of my invention is to provide a control assembly for automotive vehicles which, simple, unitary, compact and self-contained, of small compass and demanding minimum space requirements, is readily installed in either new or existing equipment with but minimum disarrangement of conventional equipment; at the same time is rigid, substantial, sturdy, giving rise to certainty of operation.

This assembly, involving a minimum number of parts, simple in themselves and associated in anti-friction manner, conduces to long wear, with low maintenance and replacement costs, as well as only moderate first cost. My construction involves a high degree of sensitivity and accuracy in control action.

All these and many other objects and advantages attend upon the practice of my invention, others of which will in part be obvious and in part pointed out hereinafter, during the course of the following description, taken in the light of the accompanying drawings.

My invention accordingly resides in the several parts, combinations thereof, elements and features of construction, as well as in the relation of each of the same with one or more of the others, the scope of the application of all of which is more fully defined in the claims at the end of this specification.

In the drawings, wherein I disclose one embodiment of my invention which I prefer at present, Figure 1 constitutes a perspective view illustrating the same in relation to an associated steering column, on which it is mounted;

Figure 4 is a bottom plan view, somewhat similar and corresponding to Figure 2, but disclosing the manner in which the automobile control linkage is associated with my new control apparatus; while.

Throughout the several views of the drawings like reference characters denote like parts.

Figure 2:
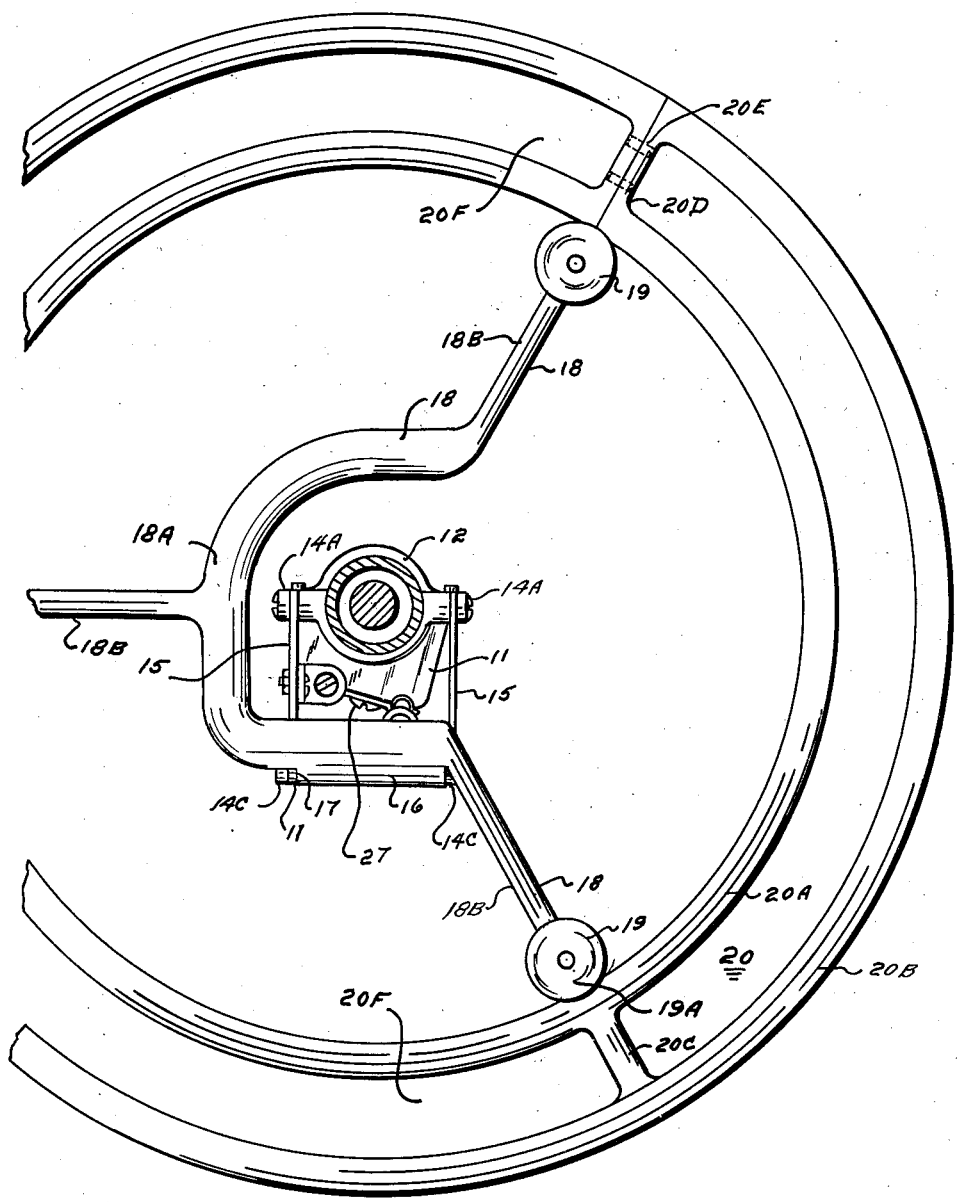
Figure 2 is a plan view thereof.

As conducive to a more thorough understanding of my invention, it may here be noted that over the past several decades remarkable strides have been accomplished in the development of automotive equipment.

To the physically able person, these vehicles present a miracle of operational simplicity. A turn of a key, the press of a button, and power becomes instantly available. The press of a clutch pedal, a flick of a gear lever, and the vehicle is brought into motion. Velvety controlled stop is assured by pressure on the brakes, developed into a high degree of refinement. Driving for the able person is no longer a venture; comparatively tireless, it constitutes a pleasurable vocation or avocation, as the case may be. The hazards of the road are reduced to the very minimum. Livelihood or pleasure, or both, is afforded to countless thousands.

It must be borne in mind, however, that the effortless ease of application pointed out hereinbefore is for all practical purposes, limited to those who are physically able. This is so because so much of the essential control action is occasioned through foot controls. All clutching and braking is carried out by foot action in conventional equipment. The ordinary person has little comprehension of the high degree of frequency with which gears are shifted and brakes applied in ordinary driving. After a brief apprenticeship, this becomes second nature to him.

To the handicapped person, however, this requirement of foot manipulation looms up as a cruel and almost insurmountable obstacle barring him from entering into the enjoyment of vehicular travel. Because for him to undertake to manipulate the conventional vehicle would inflict unnecessary danger both on himself, other motorists and pedestrians. Very wisely, legislative enactment and police regulation preclude such driving by afflicted persons unless the vehicle be equipped to remove in substantial measure the element of hazard attached.

Particularly since the second World War has produced so many maimed persons—casualties who would have become fatalities except through modern medical technique—it has become essential to open up economic possibilities to afford them means of livelihood; or to make available to them as many of the pleasures as possible, as are available to the physically able. It is only fitting that this be, as a grateful recognition of their contributions to our national welfare.

It is needless to say, then, that over a period of time, concentrated effort has been directed, from myriad facets, towards the development of automotive controls which can be adequately and easily handled by a handicapped person with safety both to himself and others. The ultimate objectives have always been in view, including among them simplicity, low cost, reliability, sturdiness, compactness, ease of manipulation, and readiness of installation both in new and old equipment. Because they fell short in some one or more respects of the foregoing and allied requirements, however, controls of this general type have never heretofore proved entirely satisfactory. They have never come into widespread use. No standard type, no stereotyped class, has come into acceptance. For all practical purposes, the handicapped person is still practically as hemmed and fenced in, and frustrated from his objectives, as he ever was. Prior devices have almost invariably proved too costly, too cumbersome, too bulky, too delicate, and too unreliable in operation, too difficult to manipulate, too complicated of installation, to make them feasible from a practical standpoint.

An important object of my invention, therefore, is to avoid in large measure the difficulties and disadvantages of the prior art, and at the same time to provide a ready, easy and simple control mechanism enabling the manipulation of automobiles by handicapped persons, compact and self-contained and low in cost.

I accomplish my aforementioned objectives by providing on the steering column of an automotive vehicle, and underlying the main steering wheel, an auxiliary wheel, longitudinally movable in floating manner relative thereto. This auxiliary wheel has indirect pivotal mounting on the steering column. Pivotal swinging action created between the auxiliary wheel and the steering column is translated into movement of control mechanism. Upward movement of the auxiliary wheel occasions one positive control action, while movement thereof gives rise to a second positive control action.

Figure 3:
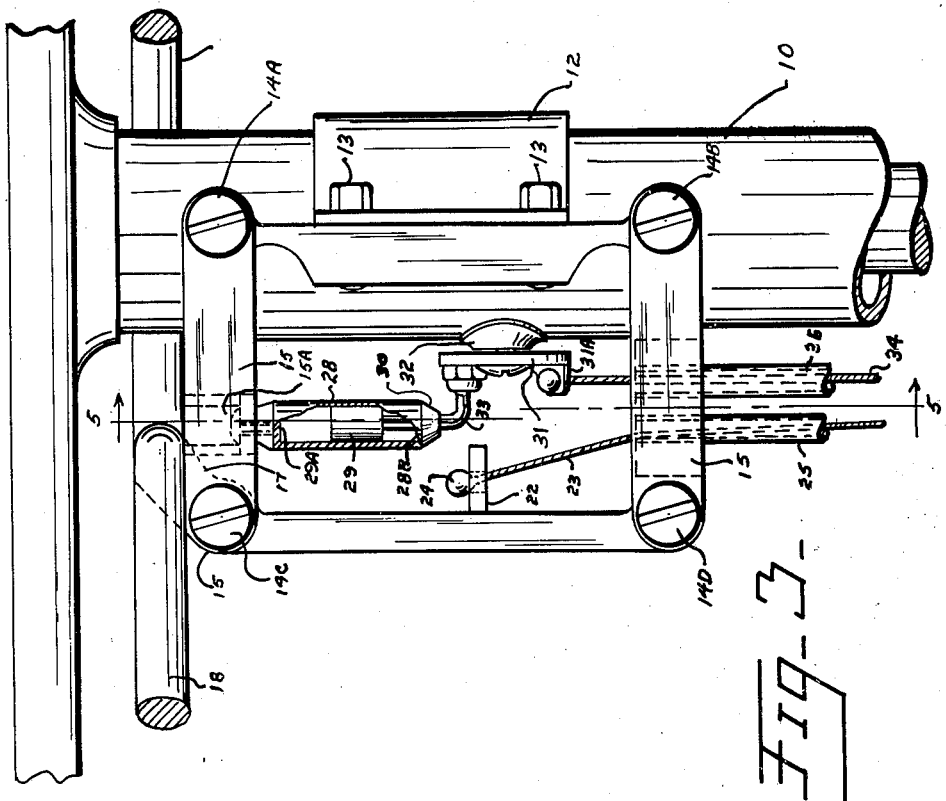
Figure 3 is a fragmentary side elevation, looking at the right side of Figure 2, and illustrating certain important constructional details.

With the foregoing generalized survey of my invention, attention is invited to the following more detailed description, recited simply by way of illustration, reference conveniently being had to the several views of the drawings. To the steering column or post 10 (Figures 1, 2 and 4) a clamp or bracket 11 is made fast by suitable means, here shown conventionally as comprising a split ring or clamp 12 held down by suitable means such as hold-down screws 13 or the like. Fast on each side of bracket 11 (Figure 2) are upper shouldered flat head screws 14A, 14A, serving as pivot members for the linkage assembly hereinafter to be described. Similar pivot screws 14B, 14B are provided at the lower end of bracket 11, on opposite sides thereof (Figures 3 and 4). Link arms 15 extend laterally and in substantially parallel relation from each pivot screw 14A, 14B. Since there are four of these latter, there are four link arms 15. They form part of a parallelogram network, shortly to be described.

A movable plate 16 comprises the front part of the parallelogram. Member 16 is pivoted by upper and lower set screws 14C, 14C and 14D, 14D to the links 15. On shoulders 17 of member 16 a spider 18 is pivotally carried. Spider 18 is subject to limited longitudinal reciprocation of the spider along steering column 10, and it is the reciprocatory motion which is translated by the parallelogram assembly into rocking control motion which is thereupon transmitted to automotive vehicular functional controls.

While spider 18 may have any convenient and suitable configuration, it is here illustratively depicted as comprising a central yoke portion 18A partly encircling column 10, and from which radiate spider arms 18B, here shown as three in number. These arms 18B terminate in antifriction sheaves 19.

Carried on sheaves 19 is an auxiliary steering wheel 20, closely underlying the main steering wheel 21 (Figure 1) and bodily movable rectilinearly thereto. While this auxiliary wheel may have any suitable configuration, it is here conventionally illustrated as comprising a pair of inner and outer concentric ring elements 20A, 20B joined along their extent by cross bar 20C, two of which, 20D, located approximately diametrically opposite each other, are split, and are joined by bolts 20E, for ease of assembly. The inner extent of ring element 20A serves as a track element for sheaves 19, the flanges 19A of the latter lock thereover to provide firm support for the auxiliary wheel 20. The rings 20A, 20B and cross bars 20C, 20D provide finger spaces 20F providing ease of grasping by the operator, and ready manipulation of wheel 20.

Thus, auxiliary wheel 20 can be readily rotated by the operator along with the main steering wheel 21. Since the wheel 20 passes freely over sheaves 19, rotary motion of the former is not transmitted to spider 18. By simple finger action, however, the operator can easily move the wheel 20 for limited bodily travel relative to wheel 21 along column 10. It is this motion, which can be accomplished either towards or away from the wheel 21, which provides the control action, hereinafter to be more fully described. Motion towards the wheel 21 can accomplish one control action, while movement away from steering wheel 21 can be directed towards accomplishing another control action.

Spider 18 is moved bodily along with wheel 20 in the rectilinear motion of the latter. It is the rectilinear motion of spider 18 which is translated through connection 17 with the parallelogram assembly into arcuate motion which provides the desired control action.

Figure 5:
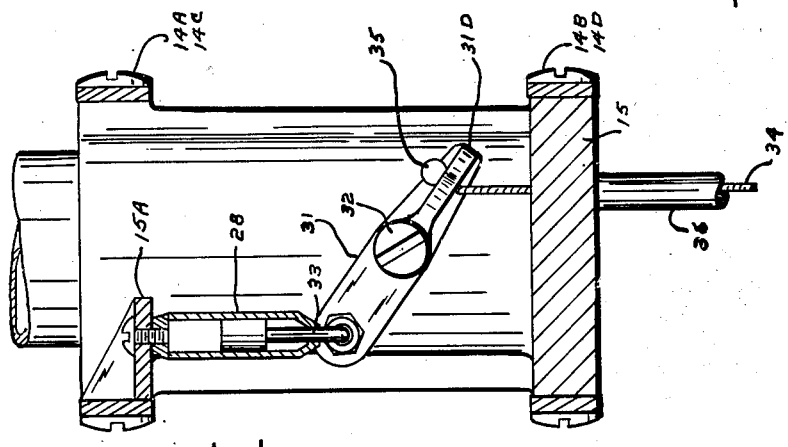
Figure 5 is a fragmentary front and vertical elevation illustrating certain constructional details of the parts disclosed in Figure 3.

The construction providing for transmission of the arcuate or swinging motion of the parallelogram assembly to the controls is as follws: A projection or lug 22 is provided on plate 16 midway along its extent (Figure 3) and centrally thereof (Figure 4), having an eyelet 22A therethrough. This lug constitutes an anchor. A cable 23 which conveniently may be connected to control a brake valve extends through eyelet 22A, terminating in a suitable enlarged stop member, here shown as spherical ball 24, disposed on the upper side of lug 22. This cable extends through outer flexible cable sheath 25 (Figures 3 and 5). Sheath 25, along with a similar sheath later to be described, is held clamped to bottom lateral extension 11A of bracket 11 (Figure 4) by suitable means, here shown as comprising clamp 26 seated on extension 11A by hold-down screw 27.

It will be seen from the foregoing that upon upward movement of wheel 20, the linkage is swung upwardly. Pull thereupon imparted to cable 23 by reaction of lug 22 against ball 24 occasions application of brakes. These are set to release, of course, as soon as tension slacks off in cable 23. Lost motion is occasioned upon reverse movement of wheel 20, in that cable 23 slides through eyelet 22A. This downward movement of wheel 20 causes no control action to be exerted on the brake valves.

Conversely, downward movement of wheel 20 should occasion some useful work function of some selected other important automotive control, illustratively, the acceleration, although obviously the device controlled may conveniently be a clutch control valve or the like. It is necessary, for proper operation of this control, that lost motion be provided during the upward travel of the wheel 20, thus ensuring an inactive or rest period of the control at this time, while a work stroke is accomplished during the down travel of wheel 20. An ingenious mechanism assures achievement of this objective.

On one of the upper links 15 (to the left in Figure 3) at 15A a cylindrical member 28 is provided, closed at its near end 28A and having a central bore 29 opening at its far end, at 28B. Telescoping therein is a piston 30. During upward travel of wheel 20, member 28 is swung to the left in Figure 3, away from piston 30. No motion is imparted to the latter. This then in large measure, constitutes the lost motion imparted to the control during the upward travel of wheel 20.

During the down travel of wheel 20, however, away from main steering wheel 21, the inner, closed end 29A of bore 29 closes against the face of piston 30, and forms a solid connection therewith. A lever plate 31 (Figures 3 and 5) is pivotally fastened to bracket 11 at stub shaft 32. Arm 33 secures piston 30 to plate 31. This plate functionally constitutes a bell crank lever. At anchor 31A of plate 31 an eyelet 31B is provided. Cable 34 extends through eyelet 31B and is anchored against complete passage therethrough by anchor 35, here shown as an enlarged spherical ball. Upon down motion of piston 30 (to the right in Figure 3) cable 34 is pulled upwardly (to the left in Figures 3 and 5) thus operatively opening the accelerator lever. Upon release of downward pull of wheel 20, means which form no part of my invention are provided to close the throttle, while additional lost motion is provided between cable 34 and eyelet 31B. Cable 34 extends through flexible cable sheath 36 (Figures 3 and 5) in its passage to the accelerator control.

It is apparent from the foregoing that rectilinear motion of wheel 20 and spider 18 is translated into arcuate motion of the parallelogram assembly which provides the direct control action, reacting against the steering column bracket 11. It is further apparent that upward movement of wheel 20, towards main steering wheel 21 gives rise to positive control action of one automotive functional control, with lost motion and consequent deactivation in another control, while upon motion of the wheel 20 in the other direction, away from steering wheel 21, positive actuation is achieved of the hitherto inactive functional control, with simultaneous lost motion or deactivation in the other control. Thus, for example, the brakes are applied while the motor is idling, and acceleration occurs when the brakes are released.

Moreover, study will show that with the limited rectilinear travel of the wheel 20 of say about two inches in a typical case, the links 15 swing through no more than about a one inch travel. The length of links 15 is such that the lateral component of movement of these later is so trivial as to be negligible from a practical standpoint and is found to occasion no binding of wheel 20 or wear on the constructional parts.

I have found that by the practice of my invention, it is readily possible for the handicapped operator to maneuver the vehicle with but a minimum of effort and thought, with perfect safety both to himself and his neighbors. The mechanism is simple, rugged, sturdy and reliable. Its simplicity is conducive to low first cost and long wear. This long wear is enhanced by the appreciable reduction in friction permitted by my new construction between the member 16 and bracket 11, attendant upon suppression of sliding motion therebetween. Compactness and hence aesthetic appeal is imparted, together with reduction in first cost, by the ability to achieve smaller compass and size of parts than has hitherto been possible, for the same rigidity of construction and for same movement of wheel 20.

The important practical advantage attends upon the practice of my invention that it can either be installed as part of new automotive equipment, or with but little difficulty and but minimum modification can be provided in existing equipment. All these and many other thoroughly practical objects and advantages attend upon the practice of my invention.

Inasmuch as many embodiments of my invention, all falling within the scope thereof, will readily suggest themselves to those skilled in the art, once the broad aspects thereof are disclosed, and since numerous modifications can be achieved of the illustrated embodiment, I intend that the foregoing description be construed as merely illustrative, and not be taken as limitative.

I claim:

1. An automobile control system comprising in combination, a steering column, an auxiliary wheel pivotally carried on said column in a plane substantially perpendicular thereto and having limited reciprocation therealong, and connections for imparting control action of said auxiliary wheel during its reciprocation.

2. An automobile control system comprising in combination a steering column, an auxiliary wheel pivotally carried on said column in a plane substantially perpendicular thereto and having limited reciprocation therealong, and connections containing lost motion means therein for imparting control action of said auxiliary wheel during its reciprocation, up travel of the auxiliary wheel causing positive manipulation of one control and down travel causing positive manipulation of a different control.

3. An automotive vehicle control assembly comprising in combination, a steering column, a steering wheel carried thereby, a bracket on said steering column, an auxiliary wheel pivotally carried on said bracket in a position closely underlying the steering wheel and in a plane substantially parallel thereto and reciprocable relative thereto, and connections for imparting control action of said auxiliary wheel during its reciprocation.

4. An automotive vehicle control assembly comprising in combination, a steering column, a bracket thereon, a spider pivotally connected to said bracket, anti-friction means terminating the arms of said spider, an auxiliary wheel rotatably carried by said anti-friction means having limited reciprocation along said steering column, and connections for imparting control action of said spider as an incident to reciprocation of said auxiliary wheel.

5. An automotive vehicle control assembly comprising in combination, a steering column, a bracket thereon, a spider, linkage pivotally connecting said spider to said bracket, anti-friction means terminating the arms of said spider, an auxiliary wheel rotatably carried by said anti-friction means having limited reciprocation along said steering column, and connections for imparting control action of said spider as an incident to reciprocation of said auxiliary wheel.

6. An automotive control assembly comprising a steering column, a bracket thereon, linkage means pivotal on said bracket, control mechanisms connected with said linkage means, each operable in a single direction of pivoting of said linkage means with lost motion in the opposite direction, a spider pivotally carried on said linkage means, and an auxiliary steering wheel rotatably carried on said spider for limited reciprocation relative to said steering column.

7. An automotive control assembly comprising in combination, a steering column, a bracket fast thereon, a double parallelogram linkage means pivotally carried on said bracket for swing through a vertical angle and comprised of pivotally inter-connected links, control mechanisms connected with said linkage means, each operable in a single direction of pivoting of said linkage means with lost motion in the opposite direction, a spider pivotally carried on said linkage means, and an auxiliary steering wheel rotatably carried on said spider for limited reciprocation relative to said steering column.

8. As an element of a control system, a linkage system comprising parallel pivotally interconnected arms, a control element secured to said linkage system and operable upon system movement in one direction, with means providing lost motion upon system movement in the other direction, and a second control element secured to said linkage system and including bell-crank lever means and operable upon system movement in direction opposite to that first described, with means providing lost motion upon movement in the other direction.

9. As an element of an automotive vehicle control assembly, a parallelogram linkage assembly for pivotal bracketing on a steering column and for rocking by an auxiliary steering wheel, comprising upper and lower approximately horizontal links, an interconnecting, approximately vertical member, a cable passing through an anchor on said member and giving rise to control action in one direction of linkage pivoting, with lost motion in the opposite direction, and means giving rise to control action upon movement of the linkage in direction opposite to that first described with lost motion upon reverse movement.

ALBERT RIVINGTON STONE.

REFERENCES CITED

The following references are of record in the file of this patent:

UNITED STATES PATENTS

| Number | Name | Date |
|---|---|---|
| 968,093 | Tahir | Aug. 23, 1910 |
| 1,371,580 | Smith | Mar. 15, 1921 |
| 1,809,021 | Butler | June 9, 1931 |
| 2,103,557 | Sawdey et al. | Dec. 28, 1937 |
| 2,207,435 | Jones | July 9, 1940 |

FOREIGN PATENTS

| Number | Country | Date |
|---|---|---|
| 134,973 | Great Britain | Nov. 20, 1919 |
| 330,184 | Great Britain | June 5, 930 |